(12) United States Patent
Williamson

(10) Patent No.: US 7,703,795 B2
(45) Date of Patent: Apr. 27, 2010

(54) TRANSFORMABLE CART AND SEATING APPARATUS

(76) Inventor: John Thomas Williamson, 4934 Citadel Ave., Columbia, SC (US) 29206

( * ) Notice: Subject to any disclaimer, the term of this patent is extended or adjusted under 35 U.S.C. 154(b) by 315 days.

(21) Appl. No.: 11/750,106

(22) Filed: May 17, 2007

(65) Prior Publication Data

US 2008/0284119 A1    Nov. 20, 2008

(51) Int. Cl.
*B62B 1/04* (2006.01)
(52) U.S. Cl. .................. 280/656; 280/40; 280/642; 280/652
(58) Field of Classification Search ............ 280/30, 280/639, 38, 39, 40, 641, 645, 646, 651, 280/652, 656, 642
See application file for complete search history.

(56) References Cited

U.S. PATENT DOCUMENTS

| | | | | |
|---|---|---|---|---|
| 3,180,654 A | * | 4/1965 | Westfall | ............... 280/30 |
| 5,299,826 A | * | 4/1994 | Flowers | ............... 280/651 |
| 6,557,882 B2 | * | 5/2003 | Harrington | ........... 280/415.1 |
| 6,581,945 B1 | * | 6/2003 | Shapiro | ............... 280/30 |
| 6,708,995 B2 | * | 3/2004 | Norris | ............... 280/204 |
| 6,733,026 B1 | * | 5/2004 | Robberson et al. | ....... 280/415.1 |
| 6,746,079 B2 | * | 6/2004 | Cabedo-Deslierres | .... 297/250.1 |
| 6,811,180 B1 | * | 11/2004 | Molliere | ............... 280/652 |
| 7,210,545 B1 | * | 5/2007 | Waid | ............... 180/65.1 |

* cited by examiner

*Primary Examiner*—Lesley Morris
*Assistant Examiner*—John D Walters
(74) *Attorney, Agent, or Firm*—Smith Frohwein Tempel Greenlee Blaha, LLC; Gregory Scott Smith

(57) ABSTRACT

A device that serves multiple purposes by being transformable between various states. In one state, the device operates as a cart such as is typical for transporting items to the beach for fishing or sunbathing. In another state, the device operates as a chair with a back to provide seating for a user. Finally, the device can also be adjusted to a storage state which decreases its size for easy storage. The device can be adjusted between the various states without having to use tools or without having to worry about storing, securing or keeping track of a bunch of lose parts. The device is particular well suited for fishing and can include fishing pole holders, a shade panel and cup holders.

10 Claims, 6 Drawing Sheets

TRANSFORMABLE CART AND SEATING APPARATUS

BACKGROUND

The origin of the cart concept surely followed closely behind that of the wheel. For what good is the wheel if it is not employed for the purpose of transport? The concept of a cart in its most general form, therefore, is hardly a novel concept. Early man, no doubt, invented the first cart and man has steadily innovated ever more unique designs since. The present invention is yet another unprecedented variation of the tried and true apparatus generally known as a cart.

Carts are everywhere. They vary in design perhaps as much as snowflakes vary in structure. Society uses carts for everything from serving lemonade on the outdoor patio in the summer to gathering wood for a toasty fire in the winter. The uses for carts are endless and, consequently, cart designs are nearly as unbounded. For example, along the coasts of our great nation, people use sundry carts to organize themselves for a convenient and relaxing day of fishing. Whether the redfish are biting somewhere along the beach or the pompano are being caught off the local pier, coastal fishermen commonly employ a cart of some kind to transport all their equipment to the hot spot du jour.

Ah, to go fishing. What a simple pleasure it is. Once the hook is baited and in the water, time seems to slow down. The euphoria of going fishing, however, is often squelched by the overwhelming logistical exercise of organizing and transporting all the necessary equipment. It is not uncommon for a fisherman to use old grocery store shopping carts, wheelbarrows, or even a child's red radio flyer. They have to have a way to get all the equipment to the fishing site, and just plain carrying it is not realistic—mainly because any trip between the shore and the car beyond the required first trip cuts into the fishing time and, could cost the angler that one special bite. Coastal fishermen, especially, need coolers with ice, bait, tackle boxes, fishing rods, chairs, umbrellas, etc., etc. Any way that this process of getting equipment to a site can be streamlined is a welcomed innovation by fishermen everywhere.

So it is clear, a cart goes hand in hand with a serious fisherman. However, there is always the space issue. Simply put, the average person simply does not have enough space in his or her garage or basement to neatly store all of his or her toys or equipment. For the angler, the fishing poles neatly hang on a few hooks on a wall in the garage—but a cart? A fishing cart that is of adequate size to meet the fisherman's toting requirements is certainly going to take up valuable garage area. One technique to address the storage space requirements for a cart is simply to disassemble the cart. However, the typical cart, once assembled, is never to be disassembled—especially if the assembly process was cumbersome and directed by poorly written instructions. And if a user is required to disassemble the cart for storage, the process is typically time consuming, requires the user to hunt down and collect all of the necessary tools and finally, once disassembled the user must take care to ensure that all the parts are securely stored in a manner to prevent them from being misplaced, lost or tossed prior to the next assembly process. Therefore, what is needed in the art is a cart that can be used by an angler or any other equipment toting human but that can be easily stored using a minimum amount of space, tools, effort and that does not include any risk of losing critical parts.

Carts are great and all but one of the big problems with carts is that they aren't good for much else other than hauling equipment. Thus, other than during the short periods of time when equipment or supplies are being hauled from point A to point B, a cart generally just sits around and provides no benefit whatsoever. It would be beneficial if the cart could actually be used for another purpose while it is not being used to haul equipment. Furthermore, it would be even more beneficial if the cart could be used for another purpose and, that purpose could help to reduce the amount of equipment that needs to be hauled by the cart. For instance, when tailgating, fishing, heading out to junior's baseball game or the like, one of the typical necessities is adequate seating. Well if you have ever been the victim stuck with the task of toting the fold-out chairs, you will fully understand that any relief from this task is quite welcomed. Thus, what is needed in the art is a cart that can not only help to tote seating devices, but that can actually operate as a seating device in and of itself when it is not being used to haul equipment.

Therefore, what is needed in the art is a cart system that is not just a simple cart for organizing and transporting equipment, but is also collapsible for ease of storage when not in use and transformable into a seat once its duties as a transport device have been completed.

SUMMARY

The present invention address the above-mentioned needs in the art, as well as other needs, and can be embodied in the form of a transformable device that in general, can be adjusted to reside in one of two or three states including, but not limited to, a cart state, a seating state and a storage or collapsed state. Thus, one embodiment of the invention is a device that can be transformed without the need of tools, between a cart, a seat and a collapsed state for easily storing. Advantageously, such an embodiment of the present invention allows the user to carry items while the device is in the cart state, and once arriving at the desired destination, to empty the contents of the cart and convert the cart into a chair. Thus, not only does this embodiment of the present invention assist the user in the transportation of equipment but it also advantageously eliminates the need to tote at least one chair.

In one embodiment of the invention, a frame structure that includes multiple frames pivotally connected to each, can be transformed between the three states: cart, chair and storage. In addition, a handle is pivotally attached to the frame structure and can move between a first position which serves as a base to the cart or a second position which serves as a support structure for the seat. The handle can include one set of wheels on the end that is connected to the frame structure to assist in moving of the cart in a hand-truck or wheel barrow configuration or could include two sets of wheels to operate in a wagon type configuration. Further, in some embodiments, one or more of the sets of wheels can be locked to prevent rolling.

More specifically, the frame structure may include a base frame with a left-side frame, a right-side frame, a front-side frame and a rear-side frame all pivotally attached to appropriate sides of the base frame. In one embodiment, the left-side frame and the right-side frame are pivotally attached to the base frame at a first height that is sufficient to allow the left-side and right-side frames to pivot over and lay flat onto the base frame, or at least slightly above the base frame. In addition, the and the rear-side frame and the front-side frame are pivotally attached to the base frame at a second height that is sufficient to allow the front-side and rear-side frames to pivot over and lay flat onto the left-side and right-side frames, or slightly above them. The front-side frame also includes a handle-seat frame that can pivot relative to the plane of the front-side frame and at a minimum, can pivot to being in the same plane as the front-side frame for storing and perpendicular to the front-side frame (or more) for seating and for pushing the cart. Another aspect of the present invention is the inclusion of multiple open-ended barrels that are fitted with a stop mechanism at one end and attached to one of the various frames. Each barrel is can receive a device such as an attachment, fishing rod or umbrella. In addition, another aspect of the present invention is the inclusion of an insert that can be inserted into a trailer hitch for transporting the transformable device.

Other aspects, embodiments and features of the present invention will be more fully understood by examining the figures, along with the detailed description and the claims.

DETAILED DESCRIPTION

The present invention is generally directed towards a portable device that can be converted on-site between one of three states: cart, chair and storage. An exemplary embodiment of the invention includes a collapsible fishing cart system used for transporting fishing equipment and supplies as well as to provide a fishing seat and rod holder once at the chosen fishing site. However, embodiments of the present invention are also suitable for many other purposes including, as non-limiting examples, tail-gating, camping, hiking, attending sporting events, picnics, parades, gardening, hunting, bird watching, pyrotechnic events, or the like. More specifically, in one embodiment, the invention can be configured to reside in any of three states: 1) a collapsed state for space savings and easy storage, 2) a utility cart state for ease of transporting sundry supplies, and 3) a seating state for convenient and comfortable seating via a sturdy seat with a back and, in some embodiments, including an elevated mounting apparatus that can be used to hold a multi-rod mount site, a shade-casting device, cup-holders and various other accessories.

Figure 1:
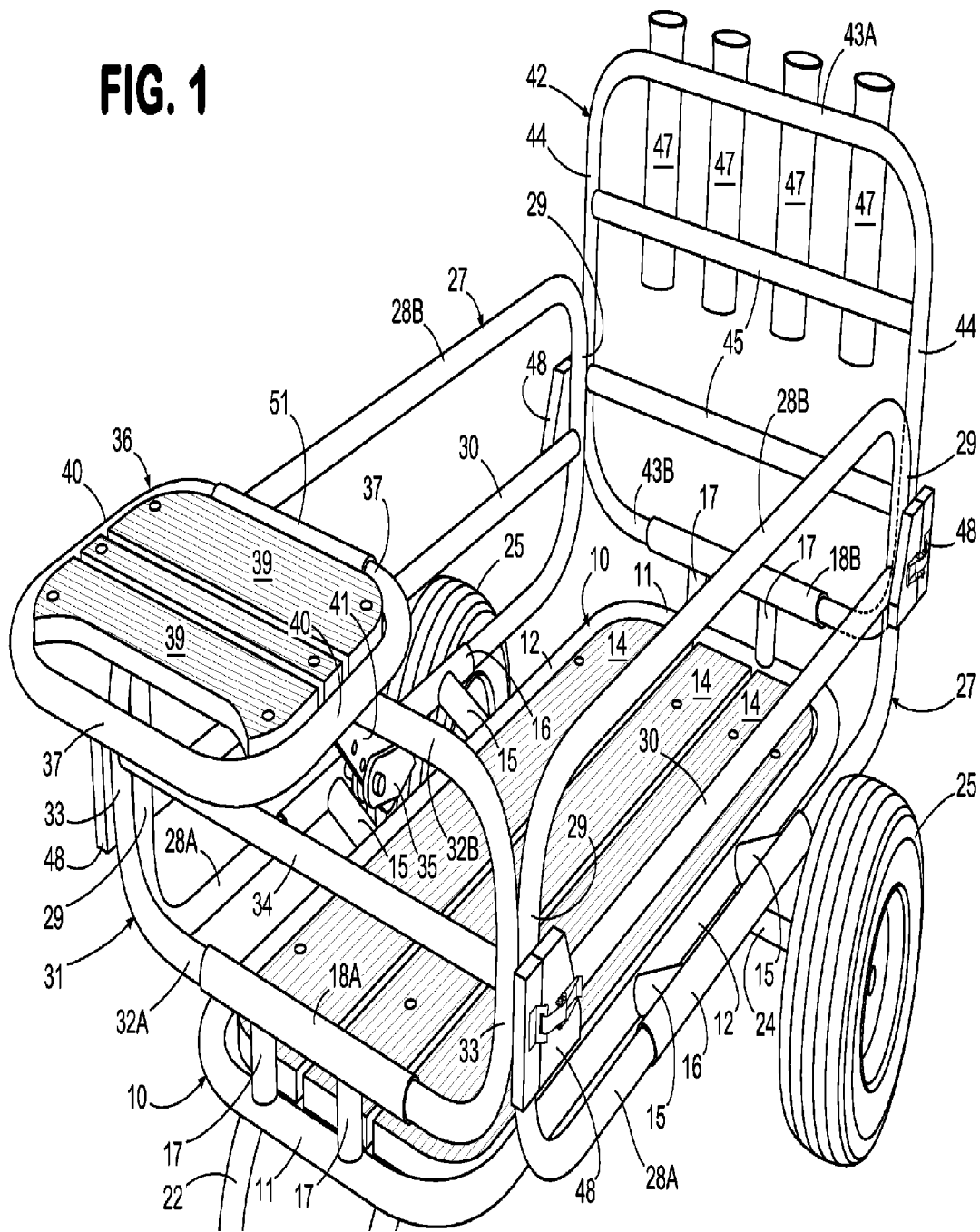
FIG. 1 is an isometric illustration of the preferred embodiment of the invention when in the utility cart state.

Referring now to the drawings, hereinafter FIGS. 1 through 4, exemplary embodiments, aspects and features of the present invention are described. In its simplest form, one embodiment of the present invention is fitted with wheels on an axle and includes multiple frames that are hinged to one another in such a way that it is possible to move and/or adjust the frames or panels into various positions, and thereby transform the device between any of several states. FIG. 1 depicts one embodiment of the present invention in a utility cart state and is the primary drawing used in this detailed description. Two other states: the storage state and the seating state are illustrated respectfully in FIG. 3 and FIG. 4.

In the illustrated embodiment, the device is anchored by a substantially rectangular base frame 10 oriented such that the two short parallel lengths 11 represent the front and rear of the base frame 10 while the two longer parallel lengths 12 represent the sides of the base frame 10. Although the base frame is illustrated as being rectangular, the exact dimensions are only provided as an example and in fact, in various embodiments, the base may be square, long-wise rectangular, shortwise rectangular, oval, elliptical, D-shaped or any other of a magnitude of varieties. The base frame 10 can actually be a panel fabricated from a wide variety of materials or, as illustrated may actually be constructed of tubing material, such as aluminum, titanium, steel, PVC or other materials. In the illustrated embodiment, the base frame 10 includes a plurality of cross members 13A and 13B (see FIG. 2) rigidly fixed to a set of parallel base frame sides 12 (the longer sides as illustrated in this embodiment) and are placed parallel to one another and in the same plane as the base frame 10. A series of boards or other fascia material 14 are rigidly fixed to the cross members 13A and 13B such that a flat surface is created within the confines of the space defined by the base frame 10. Obviously, in a panel type embodiment, such boards or fascia material is not required. In addition, rather than rigidly attaching the fascia material 14, the material can be constructed to lay on the cross members 13A and 13B or be attached to the cross members in a manner that allows for the easy removal of the fascia material 14.

One or more support stubs 15 (two are illustrated in FIG. 1) extend outwardly from each side 12 of the base frame 10 and in a plane ranging from a slight angle from the plane of the base frame 10 to perpendicular. The purpose of the support stubs 15 is to elevate a pair of hinge-supports 16 of some shorter length than the sides 12 of the base frame 10 to a distal position that is parallel to, and slightly above, the plane of the base frame. Similarly, there is also a one or more hinge-support stubs 17 extending up and/or outwardly from each of the sides 11 of the base frame 10 in a plane ranging from perpendicularly upward from the base frame 10 to a plane slightly angled up from the plane of the base frame 10. The hinge-support stubs 17 extending from the sides 11 of the base frame serve the purpose of rigidly positioning a pair of hinge supports 18 to the base frame 10 to be parallel to the sides 11 of the base frame 10 and simultaneously in a plane ranging from perpendicularly upward from the base frame plane to a slight angle up depending on the embodiment. The particular support-hinge 18b located on the rear end of the base frame 10, as illustrated in this embodiment, is fitted with a hole drilled through its center and on a parallel plane with the base frame 10. In the illustrated embodiment, the support-hinges are basically tubes that have a diameter that is sufficient in size to receive another tube inserted therein such that the internal tube can be rotated within the interior of the support-hinge tube. However, those skilled in the art will appreciate that although this structure, in and of itself may be considered as novel, that the present invention is not necessarily limited to this structure in other embodiments. For instance, other hinge mechanisms may also be employed in various embodiments of the invention including, as non-limiting examples, door-type hinges, vinyl or cloth based hinge tabs, plastic or vinyl clip on hinges or clips that allow for rotation, or the like.

Figure 2:
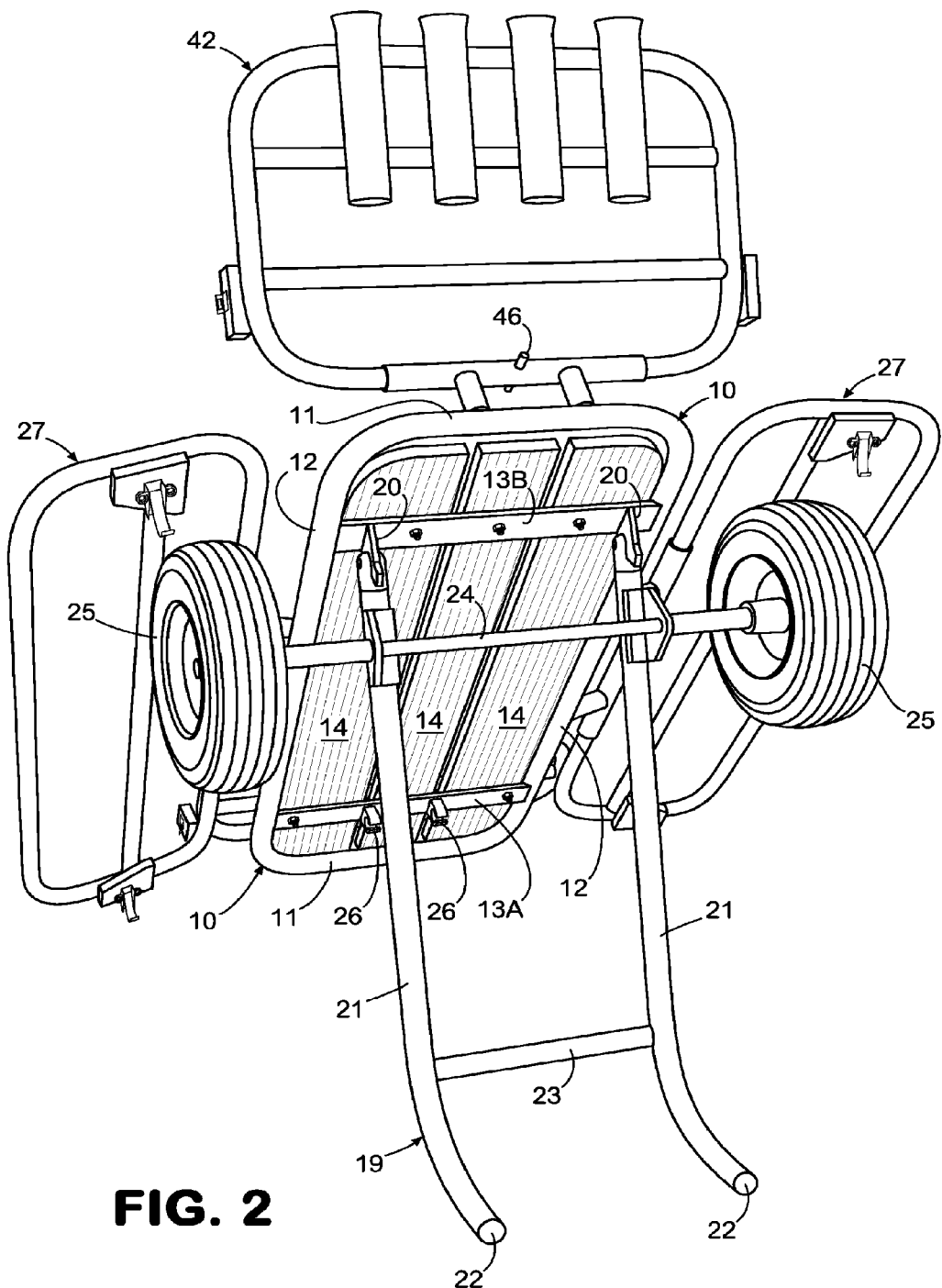
FIG. 2 is a rear view isometric drawing of the preferred embodiment of the invention when in the seat/fishing state.
Figure 3:
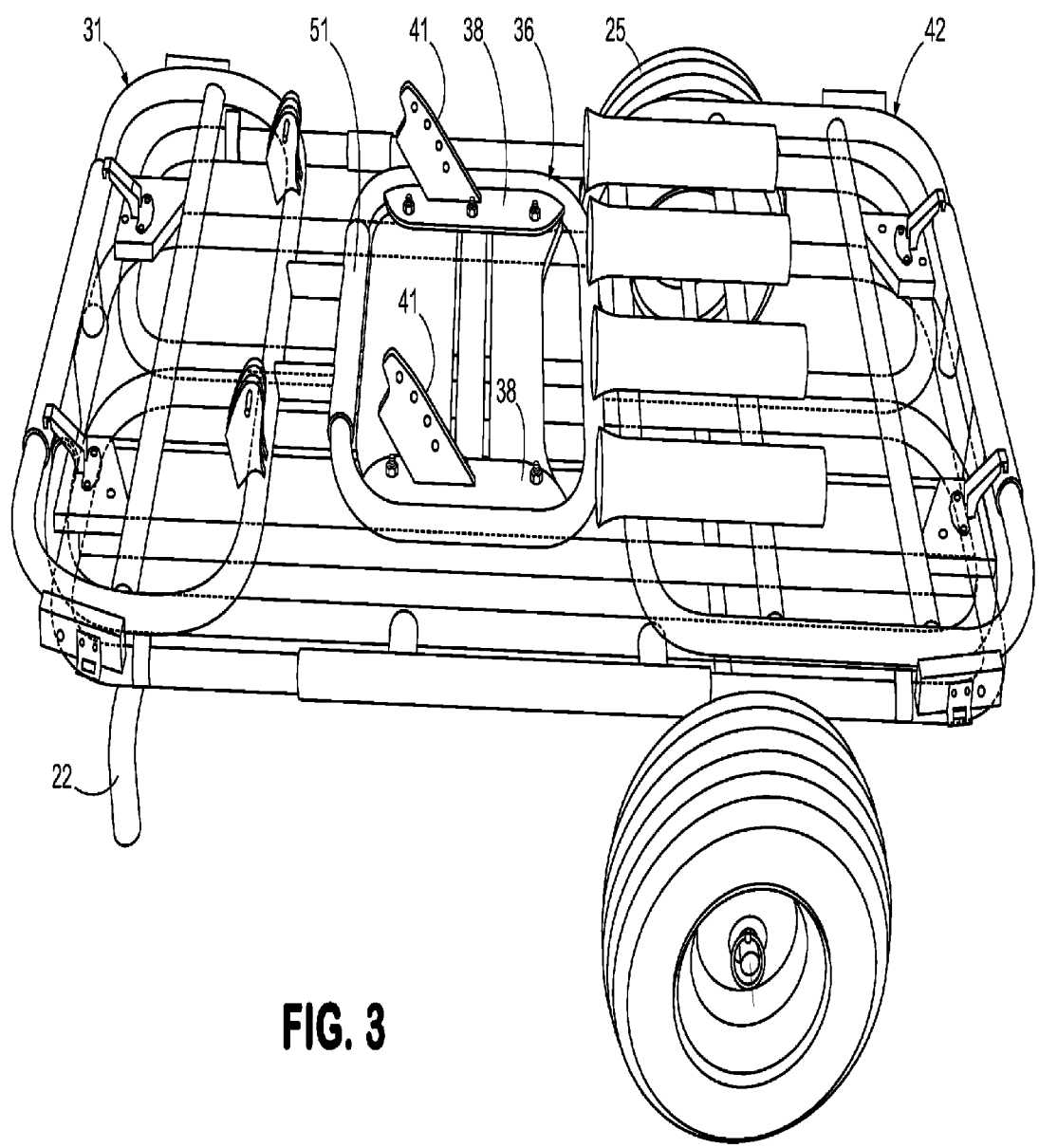
FIG. 3 is an isometric drawing of the preferred embodiment of the invention when in the collapsed state.

Referring now to FIG. 2, a separate support frame 19 is anchored beneath the base frame 10 via a pivot mechanism 20 that is rigidly fixed or integral to a cross member 13b located toward the rear of the base frame 10. The pivot mechanism 20 enables the user to rotate the bottom frame 19 between two positions or extremes. The first position places the support frame 19 in a plane substantially parallel with, and immediately juxtaposed to, the plane of the base frame 10 (as shown in FIGS. 1 and 3). The second position places the support frame 19 in a plane located some angle away from the base frame 10 (as shown in FIG. 2). The support frame 19 comprises a set of parallel members or sides 21, each anchored via said pivot mechanism 20 to the cross member 13B of the base frame and extending in parallel to some length roughly the same as the base frame 10 before bending or angling perpendicularly downward from the plane represented by the support frame 19 such that two foot members 22 are formed. At least one cross member 23 connecting the parallel members of the support frame 19 serves the purpose of exacting structural rigidity. Also, a transverse axle member 24 is fixed in parallel to the cross member 23 and located toward the pivot end of the support frame 19. Two wheels 25 are mounted on respective ends of the transverse axle member 24. It should be appreciated that in an alternate embodiment, the foot members 22 could be replaced by additional wheels or wheels that can also be locked into position. Further, the wheels 25 could be replaced with foot members and the foot members could be replaced by wheels. Finally, releasable retaining devices 26 are located beneath the base frame cross member 13a found toward the front of the base frame 10 such that the cross member 13a can be used to retain the support frame 19 against the base frame 10 when the frames are in a juxtaposed position. It will be appreciated that the support frame, although illustrated and described as a frame constructed of tubes, can also take on a variety of other forms and although the illustrated embodiment may be considered novel, it is not restrictive on the scope of the invention. For instance, the support frame 19 may be constructed of a single bar that pivotally attaches to the cross member 13B and includes a T-shape handle on the opposing end. Similarly, the support frame 19 may be a panel, independently moveable legs, telescoping poles, etc.

Referring back to FIG. 1, a pair of side frames 27 (substantially rectangular shaped as shown in this illustrated embodiment) each comprising four sides with two long sides 28A and 28B roughly the same length of the base frame 10 and two short sides 29 having a length that is roughly two thirds the width of the base frame 10 in the illustrated embodiment but can range from having a length that approximates the width of the base frame 10 or shorter. A cross member 30 runs in parallel to the long sides 28A and 28B of the side frame 27 and is fixed at either end to the short sides 29 of the side frame such that the cross member 30 is in plane with the overall side frame 27. The side frames 27 become part of the total system via one long side 28A of each side frame 27 running through each respective hinge-support tube 16, the tube 16 being affixed to the aforementioned support stubs 15 that come off the base frame 10. The side frames 27 can therefore be pivoted or rotated from a position roughly in plane with and extending from the base frame 10 (see FIG. 4) up to a position perpendicular to the base frame 10, and then over and roughly parallel to the base frame 10 (see FIG. 3). It will be appreciated that the side frames 27 may also be panels or could be constructed with support tubes extending parallel to the short sides 29, diagonally, or otherwise constructed. Furthermore, the side frames 27 can be constructed in a manner so as to be open (as illustrated) or closed (i.e., as in a panel) to prevent small items from passing through the frame. In fact, similar to the base 10, the side frames 27 may include permanently or temporarily attached fascia material.

A front frame 31 (shown as being substantially rectangular in the illustrated embodiment) comprises four sides with two long sides 32A and 32B roughly the same length as the width of the base frame 10 and two short sides 33 roughly the same length as the short sides 29 of the side frames. However, those skilled in the art will appreciate that the short sides could exist over a larger range of lengths including shorter than the short sides of the side frames 27 or longer than the short sides of the side frames 27 depending on the various uses and embodiments. A cross member 34 runs in parallel to the long sides 32A and 32B of the front frame 31 and is fixed at either end to the short sides 33 of the front frame 31 such that the cross member 34 is in plane with the overall front frame 31. The front frame 31 becomes part of the total system via one long side 32A of the front frame 31 running through a tube 18a, the tube 18a being affixed to the aforementioned support stubs 17 that extend from the front short side 11 of the base frame. The front frame 31 can therefore be pivoted or rotated from a position that lays it juxtaposed and coplanar to the base frame 10 (FIG. 3) up to a position at least perpendicular to the base frame 10 (FIG. 1).

In the illustrated embodiment, fixed to the upper long side 32B of the front frame 31 are two pairs of parallel wings or flanges 35 fitted with a plurality of holes. Each set of wings 35 extends in a direction perpendicularly upward from the front frame plane 31 when the front frame 31 is in a position juxtaposed and coplanar to the base frame 10. Each pair of wings 35 creates a nominal gap and extends roughly six inches, give or take, from the front frame 31 upper long side member 32B.

Yet another component of the system illustrated in the figures is a substantially rectangular handle frame 36 that includes four sides with its two longer sides 37 a length shorter than the longer sides 32 of the front frame 31. This handle frame 36 is pivotally attached to the front frame 31 using a hinged attachment 51. Again, the attachment of the handle frame 36 to the front frame 31 can be accomplished in a variety of manners and the illustrated attachment is similar to the mechanism used to attach the front frame 31 to the base frame 10. In the illustrated embodiment, a pair of anchor plates 38 (see FIG. 3) with drilled holes fixed to the interior of the handle frame's 36 shorter sides 40 and in plane with the handle frame 36 such that a series of boards or other fascia material 39 can be bolted or attached to the anchor plates 38 thereby defining a surface in plane with the handle frame 36. Also fixed to each anchor plate 38 is a positioning plate 41 with a plurality of holes. The positioning plates 41 are oriented to extrude from or extend from the handle frame anchor plates 38 on the opposite side from the handle frame boards 39 such that the handle frame 36 can be attached via a cotter pin to the aforementioned parallel wings 35 that are located on the upper long member 32B of the front frame 31. As such, the handle frame 36 can be pivoted with respect to the side 32B of the front frame 31 and then locked into a particular position using the anchor plate 38, positioning plate 41 and a pin.

The final frame component of the cart system is a rear frame 42. As illustrated in the figures, the substantially rectangular or substantially square rear frame 42 has four sides with two long sides 43A and 43B roughly the same length as the width of the base frame 10 and two short sides 44 having a length longer than the short sides 29 of the side frames 27. Obviously, in an embodiment in which the rear panel is square, the terms "long side" and "short side" are only used to provide identifying labels for the various sides as opposed to accurately describing the characteristics of the sides. In the illustrated embodiment, structural support for the rear frame 42 is provide by a pair of cross members 45 that run in parallel and equidistant from each other, as well as the long sides 43 of the rear frame 42 and that are fixed at either end to the short sides 44 of the rear frame 42 such that the cross members 45 are in plane with the overall rear frame 42. The rear frame 42 becomes part of the total system via the lower long side 43B of the rear frame 42 running through the aforementioned hinge tube 18B. Therefore, the rear frame 42 can be pivoted or rotated from a position that is juxtaposed and coplanar to the base frame 10 (collapsed state—see FIG. 3) up to a position that is at least perpendicular to the base frame 10 (and typically beyond this point) thereby aligning a hole drilled in the center of the lower long side 43b of the rear frame 42 with the hole drilled in the center of the rear tube 18b, thus enabling the position to be locked via a cotter pin 46 (chair state—see FIG. 2) inserted through the holes.

One aspect of the present invention is the inclusion of fishing rod holders by including a rod mount system. The rod mount system is integral to, but could also be attached in a removable manner to, the rear frame 42 and consists of a plurality of open ended barrels 47, with a pin or some other mechanism fitted at their lower end for the purpose of obstructing a foreign object placed within them from passing through. In the illustrated embodiment, the barrels 47 are fixed equidistantly apart and in parallel to one another along the upper and outer portion of the rear frame 42 such that the unobstructed open end of each barrel 47 faces up when the rear frame is in a position perpendicular to the base frame 10 (utility cart state). However, it will be appreciated that other configurations are also anticipated, such as angled, adjustable, etc.

Figure 5:
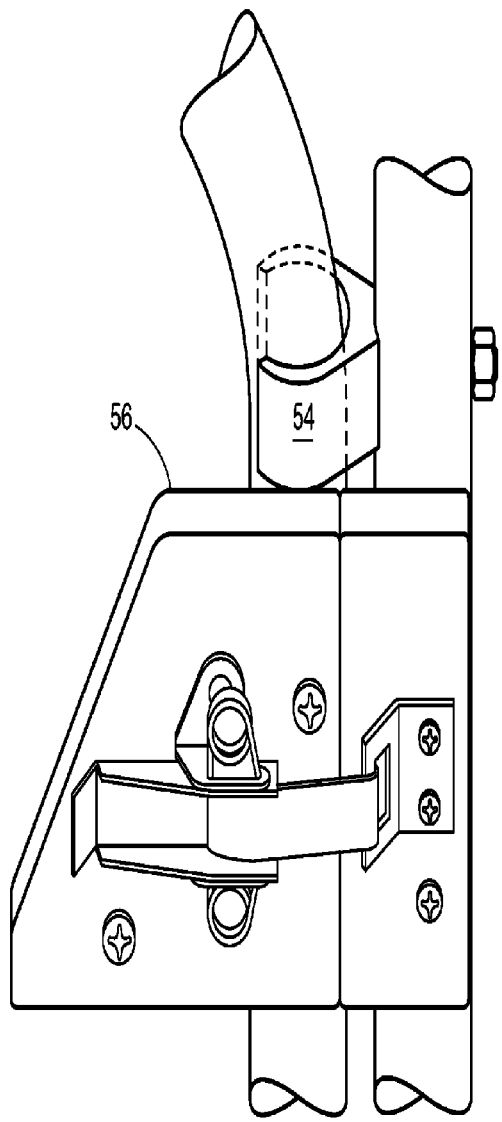
FIG. 5 is a close up view of a connection assembly usable in various embodiments of the present invention.

Four releasable retaining devices 48 are located roughly mid-way up the short sides 29 of the side frames 27 such that when the side frames 27 and the front frame 31 and the rear frame 42 are all in a position perpendicular to the base frame 10, then the devices 48 can secure the system and define a box-like space with the base frame 10 comprising its bottom and the side frames 27 and the rear frame 42 and the front frame 31 comprising its sides. It will be appreciated that other mechanisms could be used to secure the frames to each other. One specific embodiment is illustrated in FIG. 5 which shows a pressure connected clamp 54 that is secured to one tube of one panel and that includes a cavity for receiving and retaining another tube. To further secure the frames to each other, a locking mechanism 56 could be used.

Figure 4:
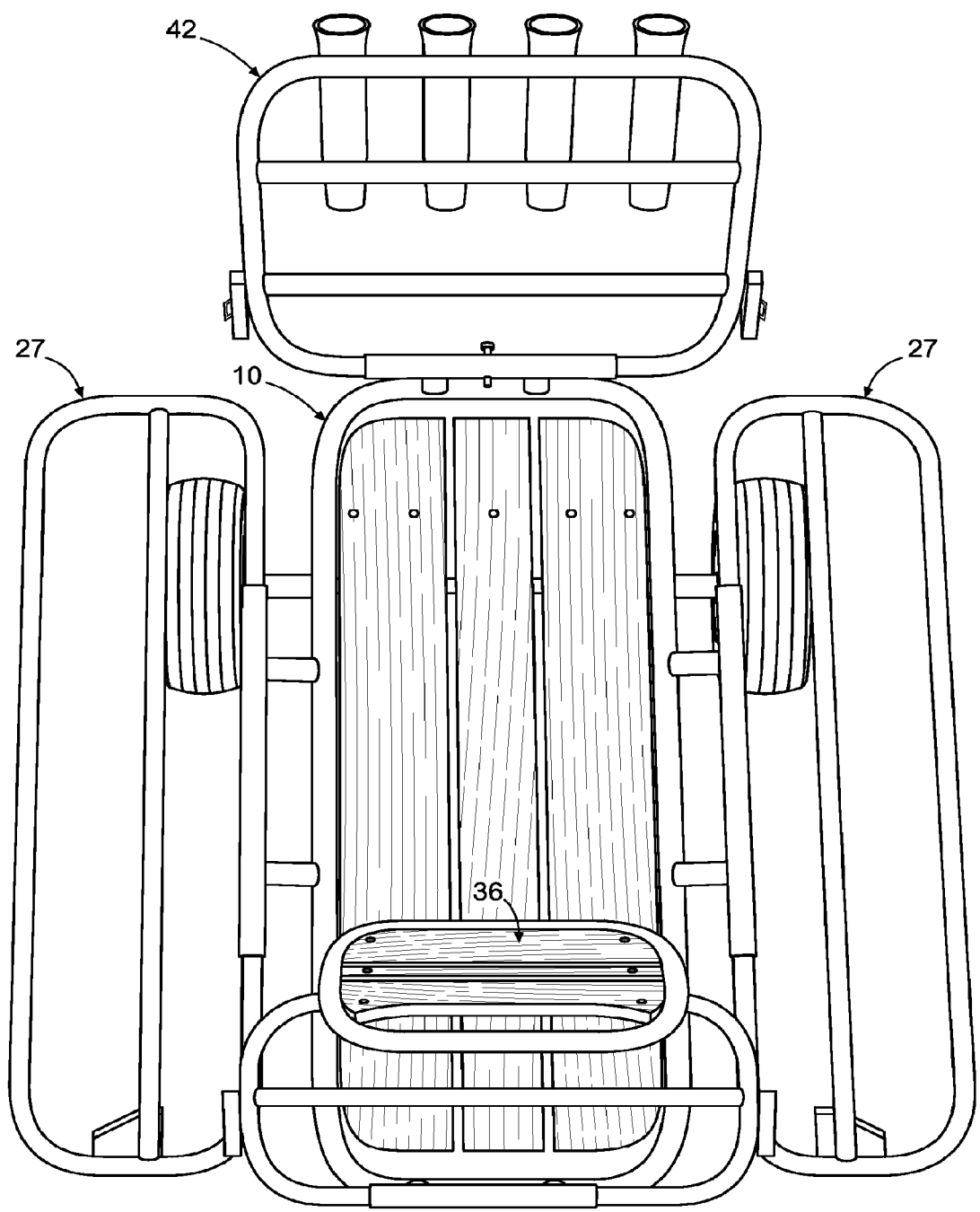
FIG. 4 is a front view isometric drawing of the preferred embodiment of the invention when in the seat/fishing state.

The present invention can take the form of three states—a collapsed state or storage state as best illustrated in FIG. 3, a cart state as best illustrated in FIG. 1), and a seating state as best illustrated in FIGS. 2 & 4). In the exemplary embodiment of the invention depicted in the figures, an operator can transform the device between the various states. Furthermore, these actions can be performed without the need of any tools. In addition, once transformed, all of the pieces of the device are still connected to each other and as such, the risk of misplacing or losing parts is minimized.

Figure 7:
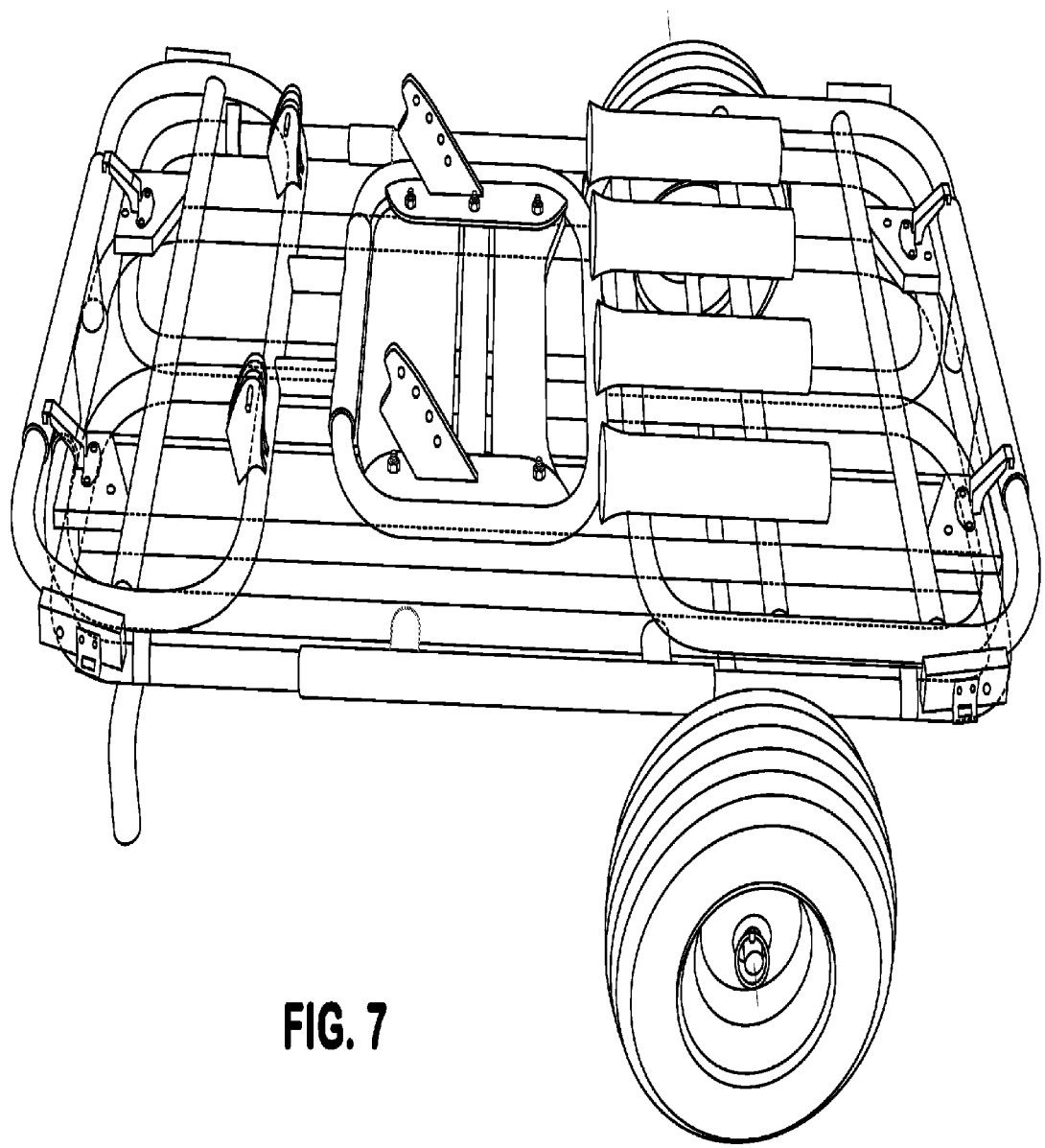
FIG. 7 is perspective diagram of the device in the collapsed state.

More specifically, a user can transform an embodiment of the invention from the collapsed state as shown in FIG. 3 and FIG. 7 to the cart state by following a few steps. It should be understood that although the steps are presented sequentially, the user can actually perform many of the steps in a variety of orders to perform the transformation. The transformation is performed by first pivoting the front frame 31, rear frame 42, and side frames 27 from their juxtaposed and coplanar to the base frame 10 positions to a position perpendicular to the plane of the base frame 10. Once pivoted to the perpendicular position, the front frame 31, rear frame 42, and side frames 27 define a box-like space such that the base frame 10 is its bottom and the aforementioned rear 42, front 31, and side frames 27 constitute its sides. Structural rigidity of the box-like space is achieved when the operator secures the frames to one another by employing the releasable retaining devices 48. It should be appreciated that any of a wide variety of mechanisms may be used to secure the frames into the box-like configuration, some non-limiting examples including cotter pins, straps, VELCRO, snaps, clamps, male/female mating connectors, etc. To complete the transformation from collapsed state to cart state, the operator need only rotate the handle frame 36 to desired position and secure it in place with the front frame flanges 35 by use of a cotter pin inserted through the flanges 35 and corresponding holes in the handle frame positioning plates 41. As a result, the device then exists in the state substantially illustrated in FIG. 1.

Once in the cart state, an operator can simply reverse the steps outlined above to return the cart system to its collapsed state. If, however, the operator chooses to transform the cart from its cart state to its seat state, then the releasable retaining devices 48 must first be disengaged. Next, the operator pivots the side frames 27 outward and away from the base frame 10 to a position that places them in contact with the tires. The handle frame 36 becomes functional as a seat by way of the operator pivoting the front frame 31 toward the base frame 10 until it is juxtaposed and coplanar to said base frame 10. Next, the operator pivots the rear frame 42 away from the base frame 10 to a position away from said base frame 10, thereby aligning predrilled holes in tubing 18B and rear frame member 43B. Once aligned, a cotter pin can be inserted through said holes such that the position of the rear frame 42 relative to the base frame 10 is fixed. It should be appreciated that other mechanisms could also be used such as clamps, or hand tightened screw clamps that allow the rear frame to be adjusted to any of a variety of positions. Finally, the operator stands up the whole apparatus such that the front member 11 of the base frame 10 is in contact with the ground, thereby enabling the support frame 19 to be pivoted away from the underside of the base frame 10 and also placed in contact with the ground at its feet 22. The complete transformation from cart state to seat state creates an "A" frame structure with the handle frame 36 becoming functional as a seat for the operator and the base frame 10 becoming functional as a back rest (see FIG. 2).

Figure 6:
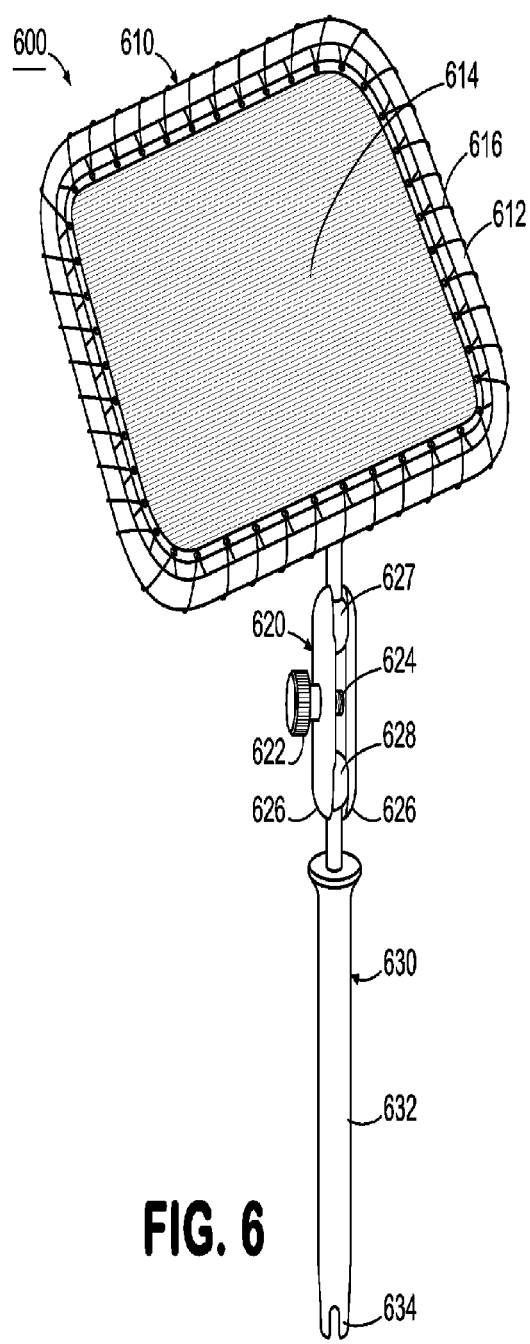
FIG. 6 is a diagram of a shade attachment assembly.

FIG. 6 is a sketch of another aspect of the present invention which is a shade canopy attachment that can be attached to the device. The shade canopy attachment 600 includes a shade canopy 610, a pivoting connection assembly 620 and a cart connection assembly 630. In the illustrated embodiment, the shade canopy 610 includes a substantially rectangular or square shaped frame 612 with a canvas or other material cloth 614 that is webbed onto the frame with a string, rope or other similar material 616. It will be appreciated that this is simply one embodiment of such a shade canopy and the present invention anticipates other such embodiments as well. The pivoting connection assembly 620 is simply a dual universal ball type joint that allows multi-directional pivoting of the canopy with respect to the connection assembly 630. A knob 622 that is attached to a screw 624 that runs through the two sides of a clamp assembly 626 is used to tighten the clamp assembly against the two balls 627 and 628 to hold the canopy into a desired position. The connection assembly 630 illustrated mates with the barrels 47 of the rod mount assembly. The connection assembly 630 includes a main shaft 632 and a securing tip 634. The securing tip 634 is constructed similar to the construction of a standard fishing pole, as is known to those skilled in the art, such that the canopy shade assembly can be inserted into a barrel 47 and then positioned in a manner to provide shade to the user. It will be appreciated that other attachments may also be provided in various embodiments of the present invention. For instance, using the same technique, lights, a small grill or hibachi, cup holders, or the like may also be attached to the device.

In addition, the present invention may also be used to hold an umbrella in place. Any umbrella that includes a fishing pole like base end could be inserted into one of the barrels and held to provide shelter from the sun or from rain.

Another aspect of the present invention is to attach, either permanently or in a removable fashion, a trailer hitch mating adapter. This aspect of the present invention advantageously would allow for the ease in transportation of the device. For instance, in one embodiment of the invention, interface to a trailer hitch could be mounted to the bottom side of the bottom frame 10. Thus, when the device is in the collapsed state, the trailer hitch interface could be slid into the receiving slot of a standard trailer hitch assembly and then secured with a cotter pin or similar device. Thus, this aspect of the present invention allows the device to be easily transported without having to be stored in the interior of the vehicle.

Thus, it will be appreciated that embodiments, features and aspects of an invention have been described herein. The specific examples, features, aspects, and embodiments presented herein have been for purposes of illustration and not intended to limit the scope of the present invention. In fact, the present invention may be incorporated into various other embodiments without departing from the spirit and scope of the present invention. Further, although many of the aspects, features and embodiments may in and of themselves be considered novel, the present invention is not necessarily limited by any such aspect, feature and/or embodiment even though such aspect, feature and/or embodiment may be presented in the claims.

What is claimed is:

1. A transformable device that can be adjusted to reside in one of at least three states including a stored state, a cart state and a seat state, the transformable device including the components of:
   a base frame having a front edge, rear edge, left-side edge and right-side edge and being constructed of aluminum tubing;
   a front-side frame pivotally attached to the front edge of the base frame, a rear-side frame pivotally attached to the rear edge of the base frame, each being attached by a raised hinge that includes a tube having an interior diameter large enough to receive at least a portion of the respective frame, that is positioned at a first height above the plane of the base frame and that allows the portion of the frame to pivot therein and the respective raised hinges;
   a left-side frame pivotally attached to the left-side edge of the base frame, and a right-side frame pivotally attached to the right-side edge of the base frame, each being attached by a raised hinge that includes a tube having an interior diameter large enough to receive at least a portion of the respective frame, that is positioned at a second height above the plane of the base frame and that allows the portion of the frame to pivot therein and the respective raised hinges;
   a handle-seat frame pivotally attached to the front-side frame opposite from the side of the front-side frame that is pivotally attached to the front edge of the base frame;
   a support frame that includes two wheels axially mounted proximate to an end of the support frame that is pivotally attached to the bottom side of the base, and a support handle on the opposing end of the support frame configured in such a manner that when the support frame is parallel to a flat surface, the two wheels and a bottom side of the support handle rest against the flat surface;
   the front-side panel, the rear-side panel the left-side panel, the right-side panel, the handle-panel and the support frame being operable to pivot between a first position, a second position, and a third position, wherein in the first position the components form a cart, in the second position the components form a seat and in a third position, the device is collapsed for storage and wherein the first height of the raised hinge is greater than the second height of the raised hinge and wherein the left-side frame and the right-side frame are sized so that when they are pivoted over and parallel to the plane of the base frame that they are side by side with each other and wherein the front-side frame, the rear-side frame and the handle-seat frame are sized so that when they are pivoted over and parallel to the plane of the base frame that they are side by side, and further, the left-side frame and the right-side frame are in a first plane parallel to the base frame and the front-side frame, the rear-side frame and the handle-seat frame are in a second plane parallel to the base frame and above the left-side frame and the right-side frame.

2. The transformable device of claim 1, wherein the frames are receptive of fascia material that can be mounted thereon.

3. A transformable device comprising the components of:
   a frame structure having a plurality of frames that are pivotally connected such that the frames can be secured into a first position or a second position, the first position having a cart shaped orientation and the second position having a seat shaped orientation; and
   a handle pivotally attached to the frame structure and operable to move from a first position which serves as a base to the cart shaped orientation or a second position which serves as a support structure for the seat shaped orientation.

4. The transformable device of claim 3, wherein the frame structure includes the following components:
   a base frame;
   a left-side frame pivotally attached to the left side of the base frame;
   a right-side frame pivotally attached to the right side of the base frame;
   a front-side frame pivotally attached to the front side of the base frame; and
   a rear-side frame pivotally attached to the rear side of the base frame.

5. The transformable device of claim 4, wherein the left-side frame and the right-side frame are pivotally attached to the base frame at a first height and the rear-side frame and the front-side frame are pivotally attached to the base frame at a second height, so that when pivoted to be over and parallel to the base frame, the left-side frame and the right-side frame are at a first height above the base frame and the front-side frame and the rear-side frame are at a second height above the base frame and above the left-side frame and right-side frame.

6. The transformable device of claim 5, wherein the front-side frame includes a handle-seat panel that can pivot relative to the plane of the front-side frame.

7. The transformable device of claim 6, wherein the handle that is pivotally attached to the frame structure is pivotally attached to the bottom side of the base frame proximate to the rear-side frame, and includes at least one set of wheels attached near the pivoting point and a support footing on the opposing end of the support frame.

8. The transformable device of claim 7, wherein the support footing is a set of lockable wheels.

9. The transformable device of claim 7, wherein the rear side frame includes a plurality of open-ended barrels fitted with a stop mechanism at one end, each barrel being receptive of a device such as an attachment, fishing rod or umbrella.

10. The transformable device of claim 9, further comprising an insert that can be inserted into a trailer hitch for transporting the transformable device.

* * * * *